United States Patent [19]
Powers

[11] Patent Number: 5,532,447
[45] Date of Patent: Jul. 2, 1996

[54] METHOD OF CLEANING AN ALUMINUM SURFACE BY PLASMA TREATMENT

[75] Inventor: John H. Powers, Lower Burrell, Pa.

[73] Assignee: Aluminum Company of America, Pittsburgh, Pa.

[21] Appl. No.: 162,564

[22] Filed: Dec. 6, 1993

[51] Int. Cl.⁶ .................................................. B23K 10/00
[52] U.S. Cl. ................ 219/121.43; 219/121.44; 219/121.59; 219/121.55; 204/298.31; 134/1.1
[58] Field of Search ................ 219/121.4, 121.43, 219/121.44; 156/345, 643, 646; 204/298.31; 428/278, 550, 302, 650

[56] References Cited

U.S. PATENT DOCUMENTS

| | | |
|---|---|---|
| 3,875,068 | 4/1975 | Mitzel . |
| 3,879,597 | 4/1975 | Bersin et al. . |
| 3,957,608 | 5/1976 | Streel . |
| 4,138,306 | 2/1979 | Niwa . |
| 4,252,595 | 2/1981 | Yamamoto et al. . |
| 4,265,730 | 5/1981 | Hirose et al. . |
| 4,267,013 | 5/1981 | Iida et al. . |
| 4,357,203 | 11/1982 | Zelez . |
| 4,362,632 | 12/1982 | Jacob . |
| 4,370,195 | 1/1983 | Halon et al. . |
| 4,412,885 | 11/1983 | Wang et al. ............................ 156/345 |
| 4,431,710 | 2/1984 | Lifshin et al. ......................... 428/650 |
| 4,442,338 | 4/1984 | Yamazaki . |
| 4,452,664 | 6/1984 | Grey, Jr. et al. ...................... 156/631 |
| 4,529,474 | 7/1985 | Fujiyama et al. . |
| 4,897,154 | 1/1990 | Chakravarti et al. .................. 156/643 |
| 5,187,046 | 2/1993 | Patrick et al. ......................... 430/278 |
| 5,298,112 | 3/1994 | Hayasaka et al. ..................... 156/643 |

Primary Examiner—Mark H. Paschall
Attorney, Agent, or Firm—Arnold B. Silverman; William J. O'Rourke, Jr.; Edward L. Levine

[57] ABSTRACT

A method of cleaning an aluminum surface includes treating the surface by cold plasma process employing a mixture of about 30 to 70 percent oxygen by volume and about 30 to 70 percent freon by volume and preferably about 40 to 60 percent by volume of each constituent gas. Performance is enhanced by employing particular wattage and flow rates. The process also produces a water wettable surface and a hydration resistant surface. The process will effect such conversions without substantial etching of the aluminum surface.

11 Claims, 4 Drawing Sheets

EFFECT OF OXYGEN / FREON RATIO ON REACTION RATE

1

METHOD OF CLEANING AN ALUMINUM SURFACE BY PLASMA TREATMENT

BACKGROUND OF THE INVENTION

1. Field of the Invention

This invention relates to an improved method for plasma cleaning of an aluminum surface and, more specifically, it relates to a rapid, effective means for employing a cold plasma process containing a preferred blend of oxygen and freon to effect such cleaning and provide other benefits.

2. Description of the Prior Art

It has been known to employ low temperature, gaseous, plasma reactor apparatus wherein a sample is placed in a chamber which under desired conditions is subject to radio frequency power to excite the carrier gas molecules and charge some of them into ions or excited gas molecules, such as those of oxygen. The gaseous plasma is highly reactive and can cause low temperature-combustion of the organic materials or impurities in the sample. See, generally, U.S. Pat. Nos. 3,875,068; 3,879,597; and 4,362,632. Among the materials on which such a system has been employed are semi-conductors which may be etched by this plasma means. See U.S. Pat. No. 4,138,306.

It has also been known to use a wide variety of gases as the carrier gas. Included within this group are, for example, oxygen, nitrogen, hydrogen, ammonia, helium, argon, and freon. See U.S. Pat. Nos. 3,875,068; and 4,442,338.

It has also been known to suggest using a mixture of oxygen and freon in the treatment of semi-conductors within a plasma generating station. See U.S. Pat. No. 4,138,306.

U.S. Pat. No. 4,357,203 discloses oxygen plasma etching of a polyamide film followed by second plasma etching employing a mixture of argon and hydrogen.

U.S. Pat. No. 4,442,338 discloses plasma etching apparatus employed for etching aluminum and aluminum alloys. The etching is effected by means of a chlorine-containing gas. After etching, thermal treatment is effected by a gas heated to 40° C. to 200° C. which may include argon, helium, neon, nitrogen, oxygen or hydrogen, or a blend thereof.

U.S. Pat. No. 4,529,474 discloses the cleaning of the inside walls of a reaction chamber employing a mixture of carbon tetraflouride and oxygen with the former being present in the mount of 8 to 30 percent. The apparatus being cleaned is one used to clean the apparatus employed in forming a deposited film by a plasma chemical vapor deposition process. It is the reaction product that is attached to the inside walls of the reaction chamber during this CVD process that is cleaned by the gas mixture disclosed in this patent.

U.S. Pat. No. 4,370,195 discloses removal of plasma etching residues using a nitrogen glow discharge for a period long enough to either remove the residues or render them susceptible to removal by oxygen plasma or organic solvents.

U.S. Pat. No. 3,957,608 discloses a method for removing surface oxidation of aluminum in a vacuum of from $10^4$ to $10^{-3}$ Torr. Oiled aluminum coated sheet steel is passed through a plasma reactor having an argon and oxygen gas mixture. The reactor also contains a block of pure aluminum. The action of the plasma is said to release the aluminum atoms from the block and have them combined with the oxygen to form alumina which is deposited on the sheet to produce a continuous alumina coated sheet.

Despite the foregoing disclosures, there remain a real and substantial need for a method of cleaning an aluminum surface in a rapid and efficient manner.

SUMMARY OF THE INVENTION

The present invention provides a method of cleaning an aluminum surface employing cold plasma techniques by treating the aluminum surface in the cold plasma process with a mixture of about 30 to 70 percent oxygen by volume and about 30 to 70 percent freon by volume. A preferred range is about 40 to 60 volume percent of each of the two gases and the most preferred embodiment employs about 45 to 55 percent each by volume of oxygen and freon.

The process is preferably employed at essentially room temperature employing a wattage of about 400 to 50,000 watts per square foot and preferably about 2,000 to 6,000 watts per square foot. The flow rate of the gases into the plasma chamber is about 400 to 1,000 cc/min and preferably about 800 to 1,000 cc/min. The process produces a water wettable surface with exposure to the plasma for only very short exposure times. It also produces a hydration resistant surface which will reduce water staining of aluminum surfaces during shipment or storage. As the process may be employed without substantial etching of the surface, it may be employed to clean anodized aluminum surfaces as well.

It is an object of the present invention to provide an improved method of cleaning an aluminum surface in a rapid, highly efficient manner.

It is a further object of the present invention to provide such a method which will effectively remove lubricant from an aluminum surface.

It is an object of the present invention to provide a method which will provide improved hydration resistance of an aluminum surface.

It is a further object of the present invention to provide a continuous process which can clean the surface of an aluminum coil at a high speed.

It is a further object of the present invention to provide such a method which does not require etching of the surface and, thereby, can be used to clean anodized aluminum surfaces.

It is a further object of the present invention to provide such a method which produces a very clean water wettable aluminum surface.

These and other objects of the invention will be more fully understood from the following detailed description of the invention on reference to the illustrations appended hereto.

DESCRIPTION OF THE PREFERRED EMBODIMENTS

As used herein, the term "aluminum" shall embrace both pure aluminum and alloys thereof.

The present invention employs a cold plasma process for treating the surface of aluminum to clean the same. A mixture of about 30 to 70 percent by volume oxygen with about 30 to 70 percent by volume freon and preferably about 40 to 60 percent by volume of each are employed in the cold plasma process. A preferred use of the process is in the removal of the lubricant from the surface of aluminum sheet. The preferred proportions of oxygen and freon in the gas employed in the cold plasma process is about 45 to 55 percent by volume of each.

As apparatus for cold plasma processes are well know to those skilled in the art, a disclosure of the same need not be provided herein.

A known means of cleaning the surface of aluminum to remove lubricant involves the use of perchloroethylene, the use of which has been prohibited by the United States Environmental Protection Agency due to environmental considerations. The present invention provides not only a means for avoiding the use of such a material, but also a means for enhanced cleaning at a more rapid rate.

As used herein, the term "reaction rate" refers to experimental results wherein a lubricant-containing sample was weighed both before and after exposure to the cold plasma treatment of the invention with the difference in weights being recorded in milligrams per square foot-second of surface treated.

Figure 1:
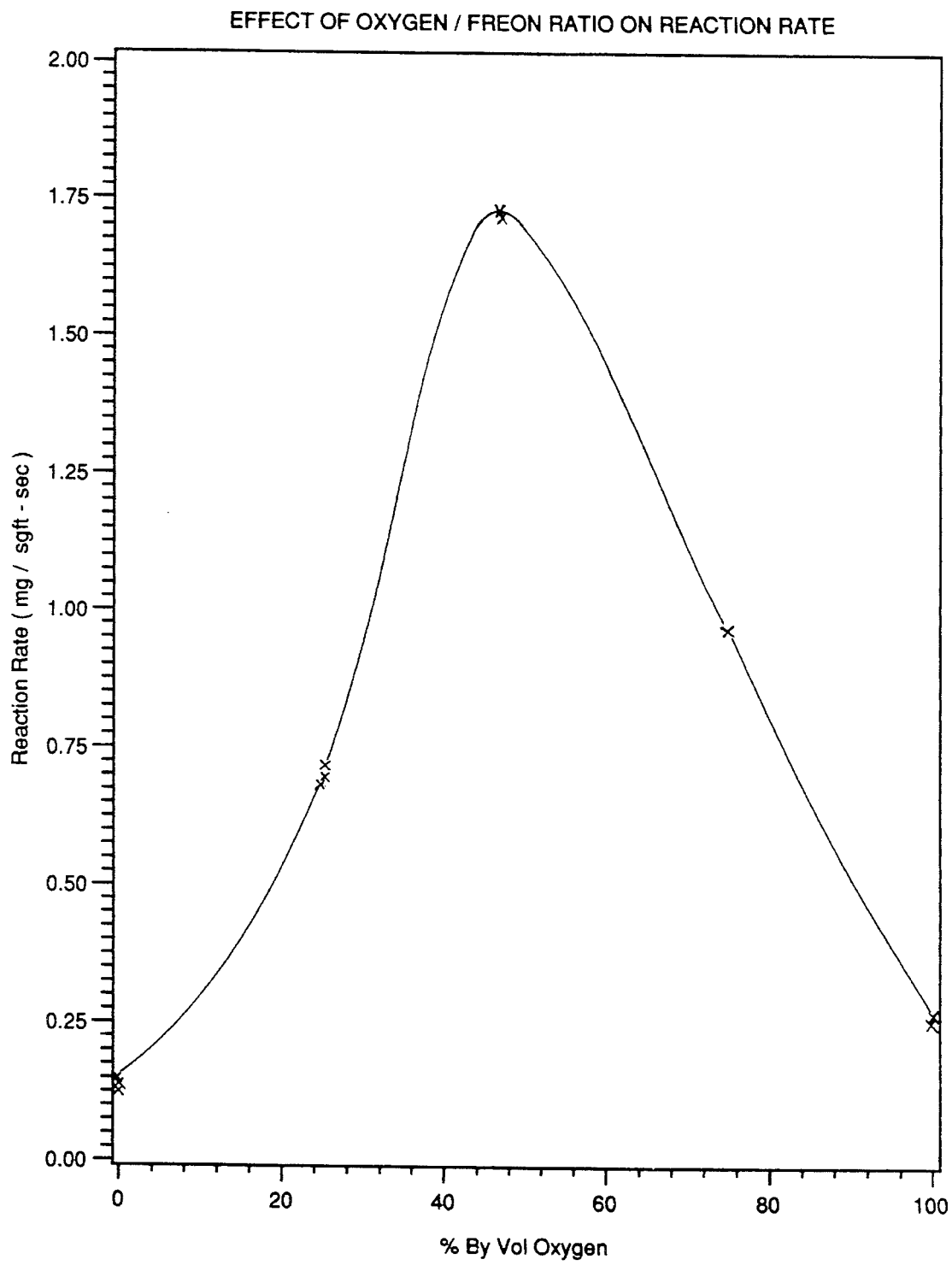
FIG. 1 is a plot of the reaction rate in mg/ft$^2$-sec compared with the percentage oxygen by volume in the oxygen/freon ratio.

Referring to FIG. 1, there is shown a plot of the reaction rate as against the percentage by volume of oxygen in the oxygen-freon mixture. The data shown in FIG. 1 was generated from an experimental procedure wherein 9" by 2" aluminum specimens of the alloy 5052 which were coil coated with an acrylic electrocoat (PPG's CS640). This material was employed in this cleaning test as it had been determined that this electrocoat material was more difficult to remove than residual lubricant which would adhere to the aluminum surface as a result of prior processing of the aluminum before coiling. In determining that the electrocoat was more difficult to remove, removal of lubricant was achieved with plasma contact times of ¼, ½ and 1 minute as contrasted with the much longer corresponding times of 1, 5, and 10 minutes for the electrocoat material.

The flow rate was 100 cc/sec and the wattage was 700. The treatment period shown in FIG. 1 was 90 sec. The higher the reaction time, the more effective the cleaning operation. As shown in FIG. 1, the highest reaction rate of almost 1.75 mg/ft$^2$-sec was achieved with a mixture of about 50 percent oxygen by volume and about 50 percent freon by volume. With the oxygen percentage by volume being between 40 and 60 and the freon percentage correspondingly being between 40 and 60, the reaction rate was approximately 1.50 to 1.57 reaction rate. For the range of 30 to 70 volume percent oxygen and volume percent freon, the reaction rate was approximately 0.85 to 1.17. These are acceptable, superior performance rates.

In general, the process preferably will be performed at room temperature, at a pressure within the plasma chamber of about 1 to 2 Torr. The wattage will be about 400 to 50,000 watts per square foot and preferably about 2,000 to 6,000 watts per square foot.

The gas flow rate will be about 400 to 1,000 cc/min. and preferably about 800 to 1,000 cc/min.

The process may be performed on a batch basis by having a limited amount of material exposed to the cold plasma at a given time, subsequently removing that amount from the plasma chamber and introducing a new specimen. It is preferred that the system be a substantially continuous system having coil-to-coil operation with the product being an aluminum sheet which passes through the plasma chamber at a rate of about 200 to 5,000 linear feet per minute. In order to maintain the desired pressure within the main chamber, entry and exit transition chambers, which are well known to those skilled in the art, may be employed.

In general, it is preferred to expose the treated sections of the aluminum surface to the cold plasma process for about 0.2 to 10 seconds.

In order to measure the effectiveness of the plasma cleaning process employing the gas blend of the present invention, experiments were performed. Five products, each of full width and 14" inch long of varying widths up to 7 feet as rolled on a cold rolling mill and containing residual lubricant oil were subjected to tests in three categories. In a first test, there was no cleaning. In a second test, the conventional solvent perchloroethylene tests were employed in the third plasma oxygen plasma gas tests were employed. These specimens included the following alloys and gauges:

| Alloy | Gauge |
|---|---|
| 5052-H32 | 0.063 inch |
| 6061-T6 | 0.090 inch |
| 3003-H14 | 0.032 inch |
| 5086-H34 | 0.080 inch |
| 5052-832 | 0.080 inch |

After treatment of individual specimens with a total of three specimens per alloy sample, i.e., one for each type of treatment, they were tested for coefficient of friction and residual carbon analysis. The coefficient of friction was selected as this property decreases with lubrication and, therefore, a higher coefficient of friction indicates more effective cleaning of the lubricant. The residual carbon level detection relates to the amount of lubricant on the surface initially and after cleaning.

Figure 2:
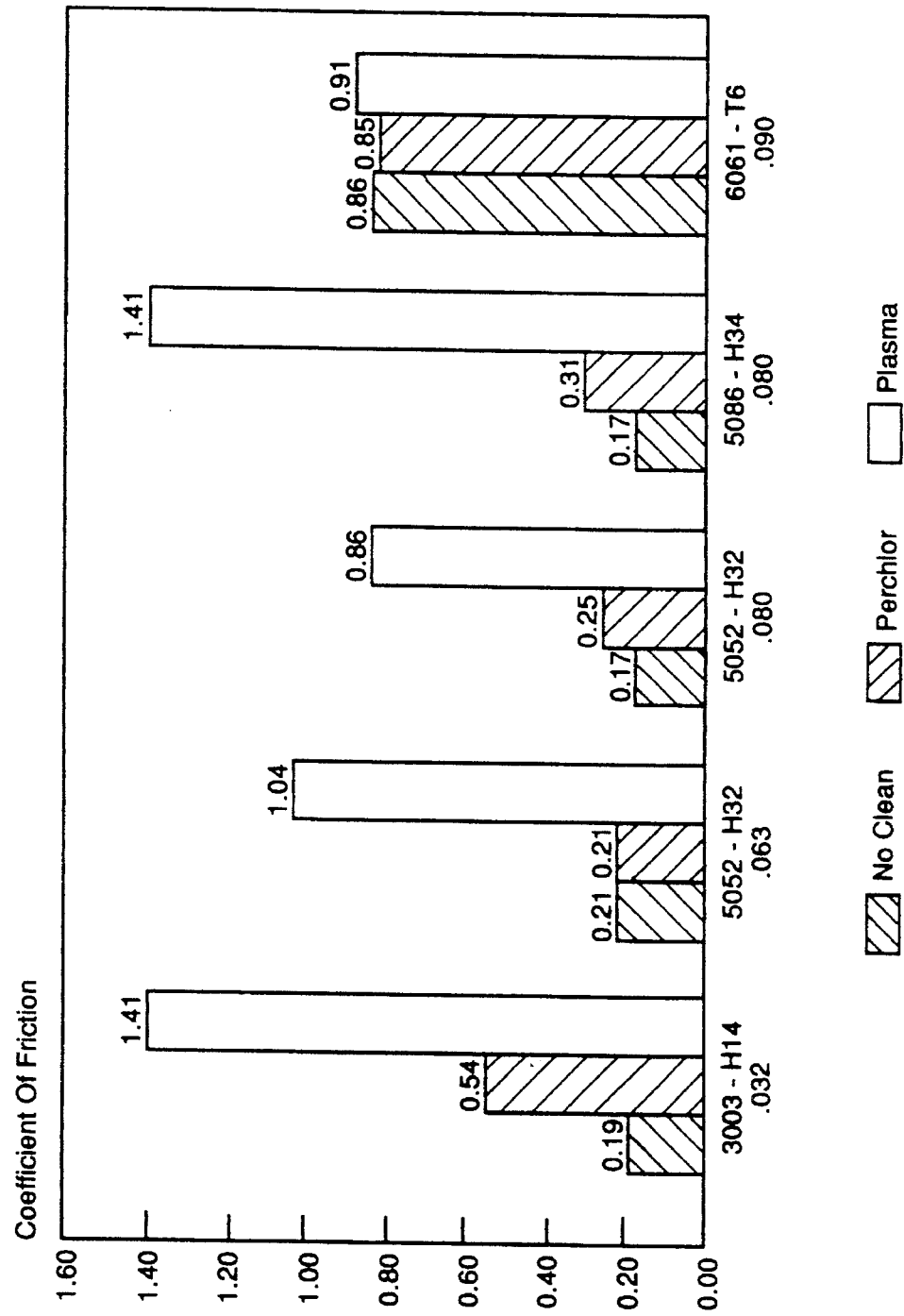
FIG. 2 is a comparative plot of the coefficient of friction and the type of cleaning process employed.
Figure 3:
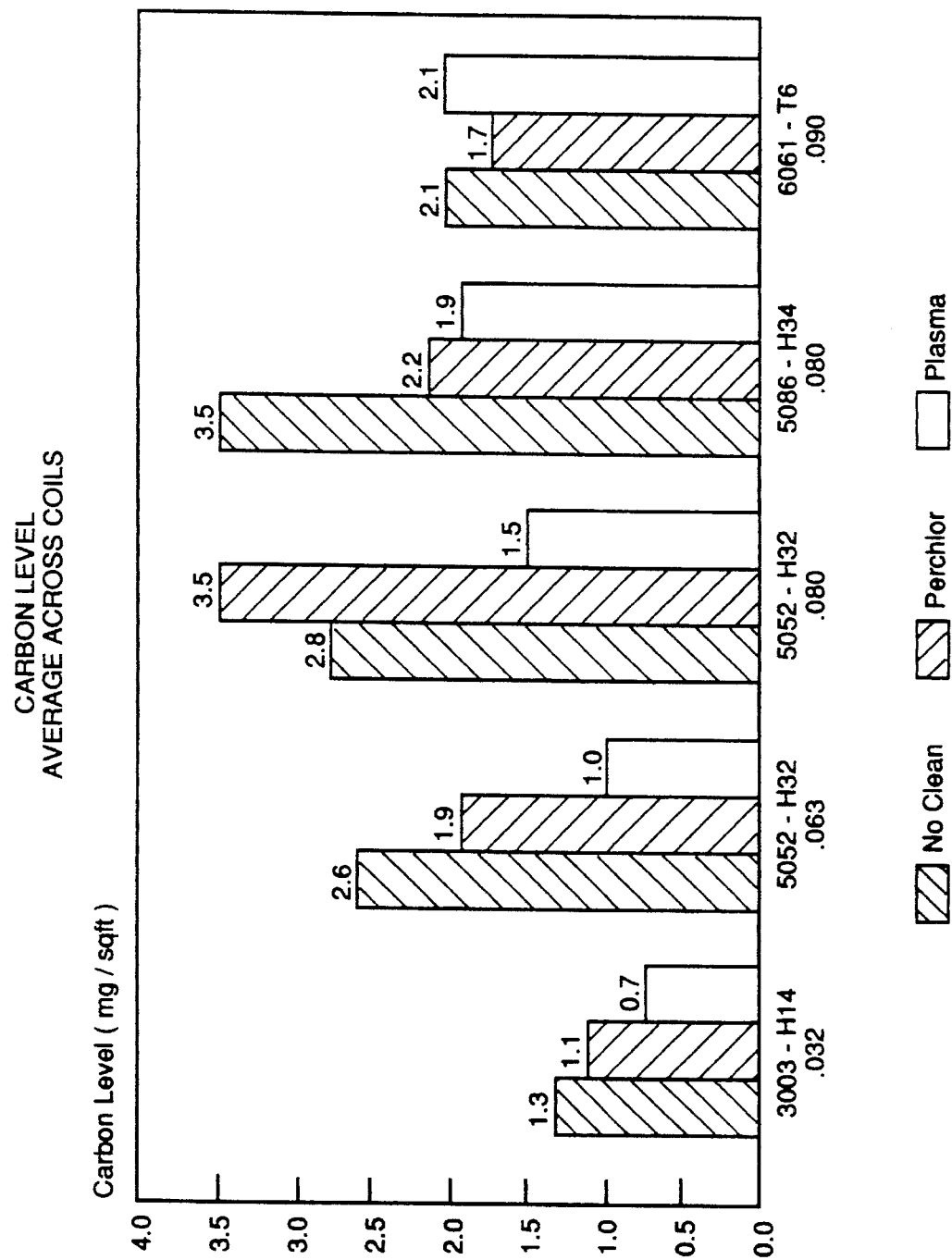
FIG. 3 is a comparative plot of the carbon level compared with the type of cleaning process employed.

The use of oxygen alone does not clean as effectively as the oxygen-freon combinations as set forth herein. The test data in FIGS. 2 and 3 are of interest in respect of showing the superiority of oxygen alone over either no cleaning or perchloroethylene cleaning. With the oxygen-freon being more effective, the results would be more dramatic. Such tests were not performed at the time of the testing generating FIGS. 2 and 3.

As shown in respect of the coefficient in FIG. 2, the plasma treatment in all instances resulted in substantially higher coefficients of friction than either the specimens which were not cleaned or those that were cleaned by perchloroethylene. With respect to all specimens, excluding the 6061-T6, the magnitude of the coefficient of friction to the other two categories shown in FIG. 2 was well over 2 to 1. The 6061-T6 did not show a change as unlike the other materials tested, it was heat treated after fabrication which treatment removes the residual rolling lubricant.

In the carbon level tests shown in FIG. 3, wherein the lower rating indicates a better cleaning result, in all instances except the 6061-T6, the plasma cleaning had a much better result than either no cleaning or the perchlorate cleaning.

The plasma cleaning was conducted in a 10" inch diameter by 20" inch diameter long, plasma barrel reactor obtained from Branson/IPC. A model 9000 power source was used to provide the 13.56 Mhz RF power. A specimen to be cold plasma treated was placed on a rack in the chamber, the door was closed, and the pressure was reduced. The gases were introduced at the prescribed flow rate after which the power was turned on for the prescribed treatment time. Subsequently, when the power was turned off and the gas flow was discontinued, the pressure in the chamber increased until the door would open, and the specimen was removed. The freon employed was Freon 14 ($CF_4$).

Table 3 shows the influence of changes in the percentage of oxygen as related to freon on the reaction rate. It will be noted that the highest reaction rates were obtained with 46.4 percent oxygen by volume.

TABLE 3

EFFECT OF OXYGEN/FREON RATIO ON REACTION RATE

| Oxygen (% volume) | Reaction Rate (mg/sqft-sec) |
| --- | --- |
| 0 | 0.14 |
| 74.8 | 0.96 |
| 74.8 | 0.96 |
| 46.4 | 1.74 |
| 25.2 | 0.69 |
| 74.8 | 0.96 |
| 100 | 0.24 |
| 25.2 | 0.70 |
| 0 | 0.15 |
| 46.4 | 1.72 |
| 25.2 | 0.72 |
| 0 | 0.13 |
| 100 | 0.25 |
| 46.4 | 1.73 |

Note:
Electrocoated Specimen/90 Second Treatment/700 watt
100 cc/min Total Gas Flow Rate Table 4 shows the relationship between the volume percentage of oxygen and the total flow rate with watts and the reaction rate. It will be noted that the highest rates have occurred when the volume percentage is 50 percent oxygen and 50 percent freon which may preferably be considered about 45 to 55 percent by volume of each. With the flow rate being in the range of 400 to 736 cc/min and the watts being in the range of 400 to 736.

TABLE 4

EXPERIMENTAL DESIGN TO DETERMINE OPTIMUM OXYGEN/FREON RATIO, TOTAL GAS FLOW RATE, AND WATTAGE TO MAXIMIZE THE REACTION RATE

| Volume % Oxygen | Total Flow Rate (cc/min) | Watts | Reaction Rate (mg/sqft-sec) |
| --- | --- | --- | --- |
| 25 | 200 | 200 | 0.13 |
| 75 | 200 | 200 | 0.55 |
| 25 | 600 | 200 | 0.04 |
| 75 | 600 | 200 | 0.61 |
| 25 | 200 | 600 | 0.50 |
| 75 | 200 | 600 | 1.40 |
| 25 | 600 | 600 | 0.15 |
| 75 | 600 | 600 | 1.58 |
| 8 | 400 | 400 | 0.00 |
| 92 | 400 | 400 | 0.60 |
| 50 | 64 | 400 | 0.87 |
| 50 | 736 | 400 | 1.99 |
| 50 | 400 | 64 | 0.49 |
| 50 | 400 | 736 | 2.59 |
| 50 | 400 | 400 | 1.70 |
| 50 | 400 | 400 | 1.75 |
| 50 | 400 | 400 | 1.67 |

Note:
9 inch by 2 inch electrocoated specimens/60 second treatment
In general, it is desirable to increase the flow rate as the wattage is increased.

Table 5 shows the variations in flow rate as compared with resulting wattage and reaction rate at a 50/50 mixture of oxygen and freon. It is noted that the wattage being between 100 and 700 at a flow rate of 303, acceptable reaction rates were obtained. As the flow rate approaches 900, however, the wattage must be increased to at least 300 to have a reaction rate of at least 1.00.

TABLE 5

EFFECT OF WATTAGE AND FLOW RATE ON REACTION RATE USING A 50% MIXTURE OF OXYGEN AND FREON

| Flow Rate | Reaction Rate (mg/sqft-sec) Wattage | | | | | | |
| --- | --- | --- | --- | --- | --- | --- | --- |
| (cc/min) | 100 | 200 | 300 | 400 | 500 | 600 | 700 |
| 303 | 1.41 | 2.00 | 2.75 | 3.60 | 4.13 | 4.83 | 5.15 |
| 413 | 1.33 | 2.03 | 3.01 | 3.36 | 3.81 | 4.99 | 5.07 |
| 648 | 1.63 | 2.19 | 3.60 | 2.83 | 4.35 | 5.07 | 5.28 |
| 771 | 1.17 | 1.81 | 2.93 | 3.76 | 4.11 | 5.23 | 5.49 |
| 893 | 0.83 | 0.77 | 1.09 | 3.52 | 4.29 | 5.25 | 5.81 |
| 1027 | 0.51 | 1.33 | 1.15 | 0.96 | 4.19 | 5.17 | 3.12 |
| 1199 | 0.56 | 0.85 | 0.35 | 0.40 | 0.80 | 0.96 | 1.17 |

Note: Electrocoated Specimens/30 second treatment

It will be appreciated, therefore, that the plasma cleaning of the present invention employing a blend of oxygen and freon within the recited ranges produces superior cleaning of lubricant and other materials from the aluminum surface.

Figure 4:
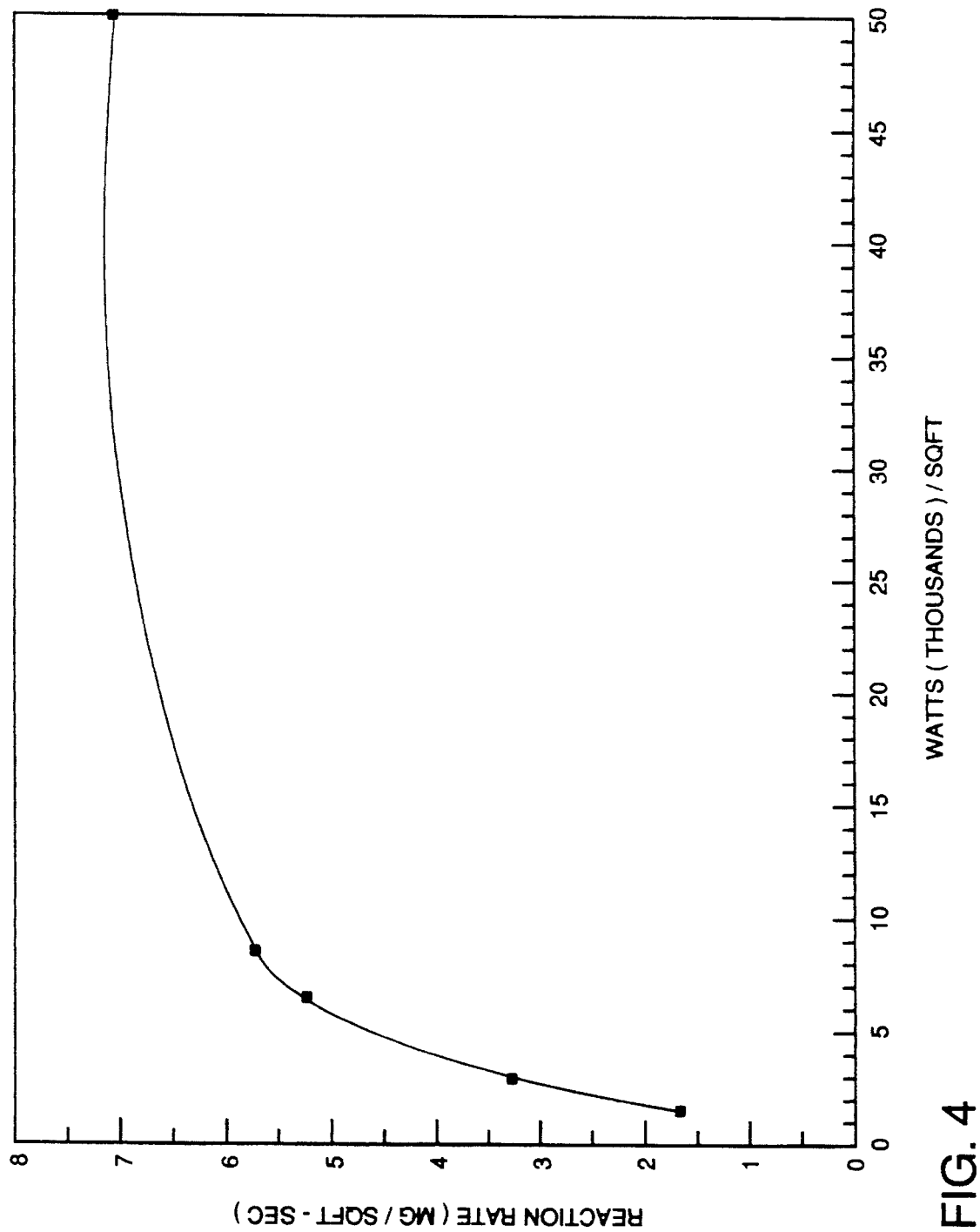
FIG. 4 is a plot of watts per square foot as related to reaction rate.

FIG. 4 shows a plot of thousands of watts per square foot versus the reaction rate in milligrams per square foot-second. As shown, the reaction rate increases at a very substantial rate until about 25,000 watts/square foot after which an additional increment of reaction rate is achieved.

It has also been determined that the surfaces produced by this cold plasma cleaning are water wettable and hydration resistant. A test employing 50 percent oxygen by volume and 50 percent freon conducted at 700 watts with a 771 cc/min flow rate confirmed that all aluminum specimens treated showed a water break-free surface after only two seconds of plasma exposure. This was the minimum time increment that could be controlled in the test. As a result, this result may have been achieved at even a lesser time. This result was achieved with slightly longer time periods even when the specimens were stacked. This shows that the cleaning by the cold plasma process is effective even when confined areas require cleaning as may be true in certain manufacturing arrangements.

The cold plasma process of the present invention also produces specimens which are hydration resistant. In comparative tests of specimens which were cleaned with cold plasma in accordance with the mixture of gases of the present invention and were not so cleaned, those that were either not cleaned or cleaned solely by oxygen developed darkening after 24 hours exposure due to surface hydration. This is a normal occurrence with bare aluminum. The specimens treated in accordance with the invention showed no such darkening. It is believed that this resistance to hydration is due to routine present on the surface of the alumina after the oxygen/freon plasma treatment.

In additional tests, hydration resistance of a specimen that was exposed to cold plasma treatment in accordance with the present invention for one minute and had 50 percent oxygen by volume and 50 percent by volume freon ($CF_4$) with a flow rate of 765 cc/min at 700 watts at 1.35 Torr were compared with several vapor degreased aluminum alloys and an alloy treated solely by oxygen plasma treatment. After 234 hours in a high humidity cabinet, the specimen treated by the present invention had not changed significantly, whereas all other specimens were extensively hydrated having a very dark, streaked appearance. This is a significant achievement of the present invention as this method would tend to eliminate or will greatly minimize the serious and costly problem of water staining.

While for purposes of convenience of disclosure herein, focus has been placed upon treating the surface of aluminum sheet for removal of lubricant or other materials and hydration resistance, the invention is not so limited. It will be appreciated that additional benefits of this type can be obtained with respect to aluminum surfaces other than the surface of a coil of aluminum sheet and for advantageous removal of other materials if desired.

Whereas particular embodiments of the invention have been described herein, for purposes of illustration, it will be evident that those skilled in the art that numerous variations of the details may be made without departing from the invention as set forth in the appended claims.

We claim:

1. A method of cleaning an aluminum sheet surface comprising:

treating said surface by a cold plasma process, said process removing lubricant from said surface of said aluminum sheet, employing in said cold plasma process in creating the plasma a mixture consisting essentially of about 40 to 60 percent oxygen by volume and about 40 to 60 percent fluorocarbon by volume, and employing a wattage of about 400 to 50,000 watts per square foot in said cold plasma process.

2. The method of claim 1 including employing an oxygen and fluorocarbon flow rate of about 400 to 1,000 cc/min.

3. The method of claim 2 including employing an oxygen and fluorocarbon flow rate of about 800 to 1,000 cc/min.

4. The method of claim 1 including employing a wattage of about 2,000 to 6,000 watts per square foot in said cold plasma process.

5. The method of claim 2 including exposing the treated sections of said aluminum surface to said cold plasma process for about 0.2 to 10 seconds.

6. The method of claim 2 including effecting said surface cleaning without substantial etching of said aluminum surface.

7. The method of claim 2 including performing said process at about 1 to 2 Torr.

8. The method of claim 1 including establishing said aluminum surface as a hydration resistant surface by said process.

9. The method of claim 1 including employing said process on coiled aluminum sheet.

10. The method of claim 1 including employing said process on anodized aluminum sheet.

11. The method of claim 1 including employing as said mixture about 45 to 55 percent oxygen by volume and about 45 to 55 percent fluorocarbon by volume.

* * * * *